J. T. MADIGAN.
GRASS CATCHER.
APPLICATION FILED MAR. 8, 1921.
1,411,289. Patented Apr. 4, 1922.
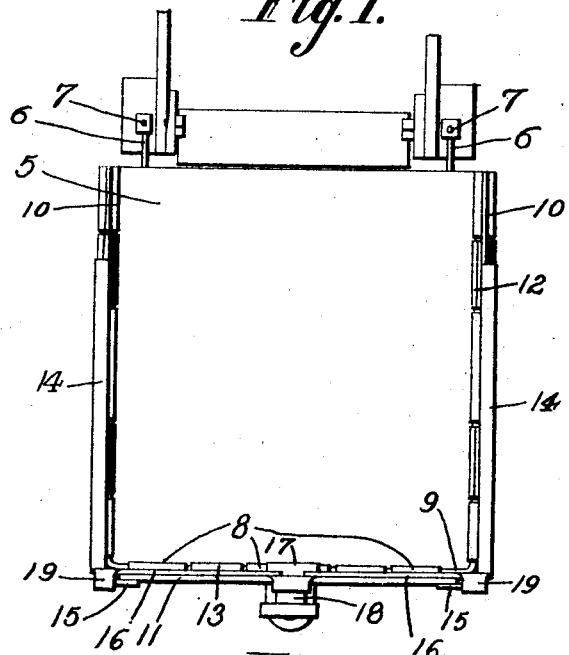
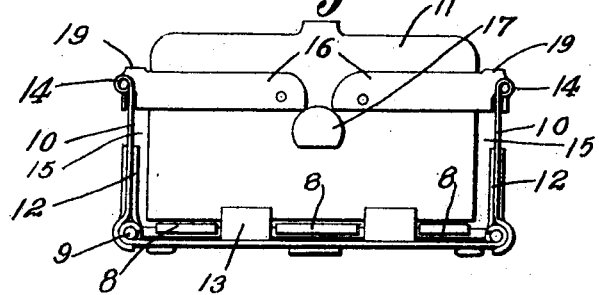
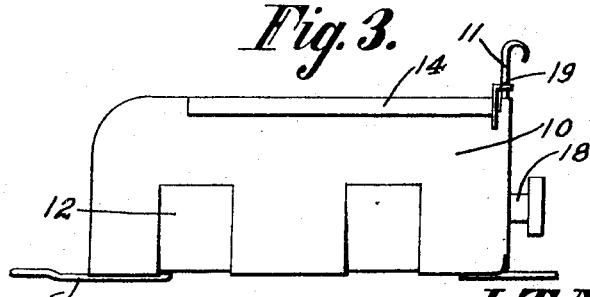
Inventor
J. T. Madigan.
By C. A. Snow & Co.
Attorney

UNITED STATES PATENT OFFICE.

JAMES T. MADIGAN, OF COLORADO SPRINGS, COLORADO.

GRASS CATCHER.

1,411,289.  Specification of Letters Patent.  Patented Apr. 4, 1922.

Application filed March 8, 1921. Serial No. 450,662.

*To all whom it may concern:*

Be it known that I, JAMES T. MADIGAN, a citizen of the United States, residing at Colorado Springs, in the county of El Paso and State of Colorado, have invented a new and useful Grass Catcher, of which the following is a specification.

This invention relates to attachments for mowing machines, the object of the invention being to provide a receiver for receiving the grass or hay cut by the mowing machine so that the cutting and harvesting may be accomplished by a single operation.

A further object of the invention is to provide a device of this character which may be readily and easily applied to the usual mower construction now in use, the receiver being of a novel construction to permit the same to be folded into a relatively small article, thereby facilitating the storing of the receiver.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a plan view of a receiver constructed in accordance with the present invention, and showing the same as applied to the roller supports of the usual lawn mower now in use.

Figure 2 illustrates a front elevational view of the same.

Figure 3 illustrates a side elevational view.

Referring to the drawing in detail, the receiver includes a bottom 5, to which are secured the arms 6 that extend forwardly therefrom, and by means of which the device may be secured to a lawn mower or the like, the arms 6 being provided with suitable openings to accommodate bolts 7, which secure the arms to the mower frame 7' adjacent to the roller 8'.

The bottom member 5 is provided with cut out portions providing a plurality of tongues 8, which tongues are bent around the rod 9, to secure the rod to the bottom member 5.

In order that the receiver may move freely over the surface on which the same is support, a slide 9' is formed on the bottom member 5 and extends rearwardly therefrom as clearly shown by Figure 3 of the drawing.

The receiver also includes hinged side members 10 and a hinged end member 11, each of the side members having tongues 12 adapted to be passed or bent around the rod 9 to provide hinge members. The end member 11 is also provided with extensions 13 which are bent around the rod 9 at points between the tongues 12 thereby providing hinges for the end 11.

As shown, each of the side members 10 has its upper edge beaded as indicated at 14 to lend rigidity to the side members, to insure the side members being supported in upright positions when the receiver is in its extended position. These side members also have the rear ends thereof extending inwardly to overlie a portion of the end member 11 as indicated at 15, so that the side members 10 form supports for the rear wall 11 to secure the same in an upright position.

Carried by the end member 11 are the pivoted arms 16, which arms have cut out portions formed adjacent to the outer or free ends thereof, which cut out portions accommodate portions of the side members 10, when the side members are in their vertical positions for supporting the end member 11 in its vertical position, there being a locking disk 17 provided on one end of the shaft 18, which extends through the end member 11 for contacting with the inner ends of the arms 16 to lock the arms against movement.

Formed integral with the end member 11 is a hook member 11' to permit the device to be hung over a suitable support while out of use and in a folded condition.

The disk 17 has a cut away portion 18' to provide a clearance when the disk 17 is moved to a position as indicated in dotted lines in Figure 1 of the drawing, whereupon the arms 16 may be lifted by means of the right angled arms 19, but it is to be understood that when the disk is in a position as indicated in Figure 2 in full lines, the disk will prevent the downward movement of the arms 16.

Having thus described the invention, what is claimed as new is:—

In a device of the character described, a bottom member, hinged side members connected to the bottom member, a hinged end member connected to the bottom member, a shaft extending through the end member, said shaft carrying a disk on one end thereof, arms carried by the end member and adapted to move into engagement with the side members for supporting the same in upright positions, and said disk adapted to engage the arms to restrict movement thereof.

In testimony that I claim the foregoing as my own, I have hereto affixed my signature in the presence of two witnesses.

JAMES T. MADIGAN.

Witnesses:
F. B. GUFFEY,
W. A. EASTON.